Figure 1:
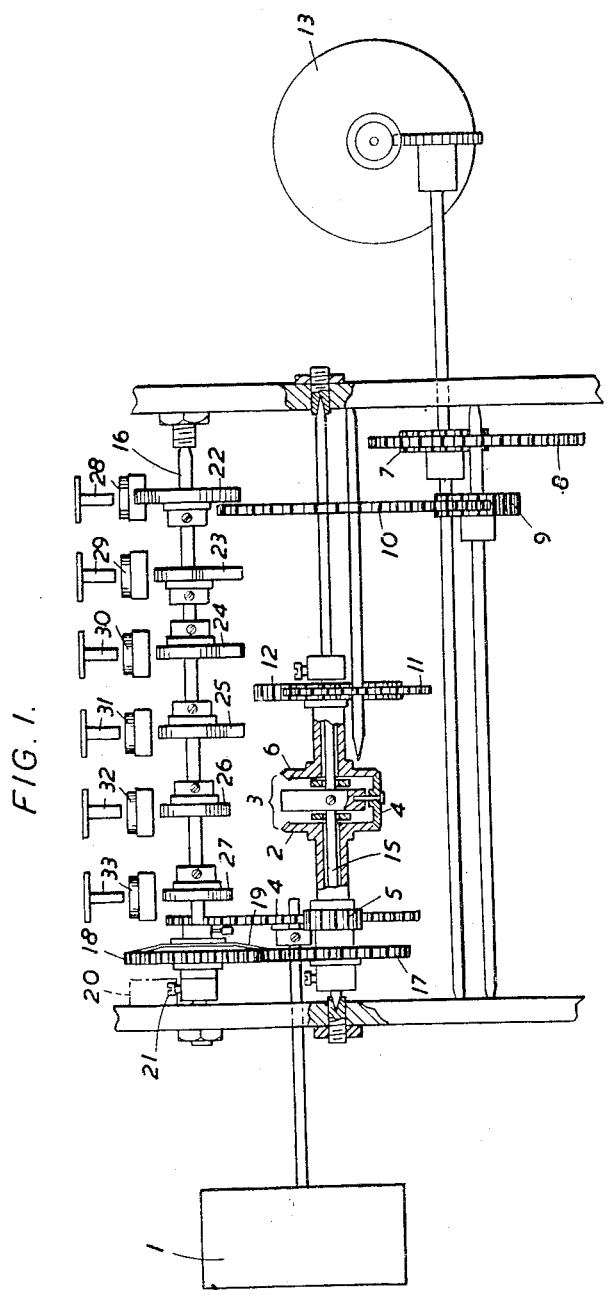

Jan. 30, 1951  E. WHITBY  2,539,760
ELECTRIC REMOTE CONTROL
Filed Oct. 19, 1948  3 Sheets-Sheet 1

FIG. I.

ERNEST WHITBY
Inventor

By [signature]
Attorney

Jan. 30, 1951 — E. WHITBY — 2,539,760
ELECTRIC REMOTE CONTROL
Filed Oct. 19, 1948 — 3 Sheets-Sheet 3

ERNEST WHITBY
Inventor
By [signature]
Attorney

Patented Jan. 30, 195.

2,539,760

UNITED STATES PATENT OFFICE 2,539,760

ELECTRIC REMOTE CONTROL

Ernest Whitby, London, England

Application October 19, 1948, Serial No. 55,311
In Great Britain April 23, 1947

8 Claims. (Cl. 171—97)

This invention relates to an improved method of and apparatus for local control and/or distant remote control of electrical circuits which depend for the actuation of the receiving apparatus or receiving relays on an alteration in the fundamental frequency of the electric current passing over the transmitting line, this alteration in the frequency taking place for definite intervals of time in such a manner that, if controlling or selective relays be employed so that more than one control operation or more than one selection operation can be carried out, the control or the selection can be made dependent upon the length of time over which the change of frequency is maintained.

Hitherto with remote control systems for operating on electricity supply circuits expensive or complicated transmission apparatus has been necessary to generate or to transmit the impulses sent over the lines to operate the distant receiving relays. With the present invention no such expensive or elaborate transmitting system is necessary as use can be made therein of the frequency control apparatus already in use at the electricity generating station for the purpose of maintaining constant the frequency of the current supplied to the feeders.

The present invention comprises appropriate controlling apparatus or receiving relays which have their control or selection operations based upon the two factors of change in the frequency and the time interval over which the change in the frequency is maintained. This apparatus can be of relatively simple construction and therefore can be made at a relatively low cost.

According to the present invention the controlling apparatus comprises a constant speed motor and a synchronous motor whose speed is proportional to the line or mains frequency. These motors drive in contra-rotation, through suitable gearing, the two crown wheels of a differential gear, the planet wheel assembly of which acts to cause a cam shaft to rotate when the speeds of the two crown wheels are unequal, e. g. when there is a change in line frequency from the standard or normal frequency. The cam shaft, whose speed and direction of rotation are dependent on the relative speeds of the two crown wheels, is provided with one or more cams adapted to operate contacts controlling electrical circuits.

The apparatus described above is particularly suitable for use as a load-shedding device controlled by the electricity supply authorities and its application for this purpose will become apparent hereinafter.

The difficulties in connection with the fuel situation in many countries have drawn attention to the necessity that the electricity supply authority should be able to control at will the use of non-essential electricity consuming apparatus and so to be able at time of fuel shortage or peak demand to eliminate temporarily from the circuit such consuming apparatus as is being used for non-essential purposes in order that the supply to consumers using the current for essential purposes should not be interrupted. Complete shut-downs of the supply to some consumers such as are now taking place, e. g. in Great Britain, due to the fuel shortage, could thereby be avoided because with the apparatus according to the present invention the control of the supplies to non-essential consumers could be carried on throughout the year in such a manner that the desired annual saving in fuel consumption could be achieved by being spread over a longer period instead of waiting until fuel stocks have fallen to a minimum. At the same time the apparatus would give the electricity supply authority complete control over the peak demand on its supply circuit by enabling non-essential classes of consuming apparatus to be cut off whenever the permissible maximum load threatens to be exceeded.

In a preferred embodiment of the invention, the controlling apparatus is combined with a maximum demand or overload cut-out device which can be set to cut out part of a consumer's apparatus whenever his maximum demand exceeds a predetermined figure. Thus with this combination it will be possible for the electricity supply authority to make a two-part tariff contract with each consumer based upon a quarterly charge dependent not as at present upon floor area or connected load or some other empirical factor but upon the actual maximum demand to which the consumer agrees to limit his load. Thus the consumer might have consuming apparatus installed to the extent of say 10 kilowatts, but would agree that he would not need to have more than say 3 kilowatts functioning at any one time and the quarterly charge would then be based on 3 kilowatts and the maximum demand device would be set by the supply authority to come into operation to cut off part of the consumer's load if he exceeded the agreed 3 kilowatt demand. Furthermore in this form of the controlling apparatus the maximum demand device could be set to cut off first that portion of the consumer's current-consuming devices which the consumer himself considers as the most non-essential—in the case of one consumer perhaps a portion of his lighting circuit, in the case of another consumer his heating apparatus.

The frequency control apparatus as used in the generating station of the electricity authorities is well known and for the purposes of the invention it is most advantageous to use such control apparatus in such a manner that for the purpose of actuating the selecting relays connected at the receiving points the frequency is varied by a small amount such as one quarter of a cycle from the normal controlled value. Such a small variation for the limited time periods during which the selections are taking place will have no detrimental effect at the supply station or on the consumers' circuits and will not be noticed by the consumers.

One preferred constructional form of the apparatus according to the present invention is shown in the accompanying drawings.

Figure 1 shows a side elevation of the apparatus, and

Figure 2:
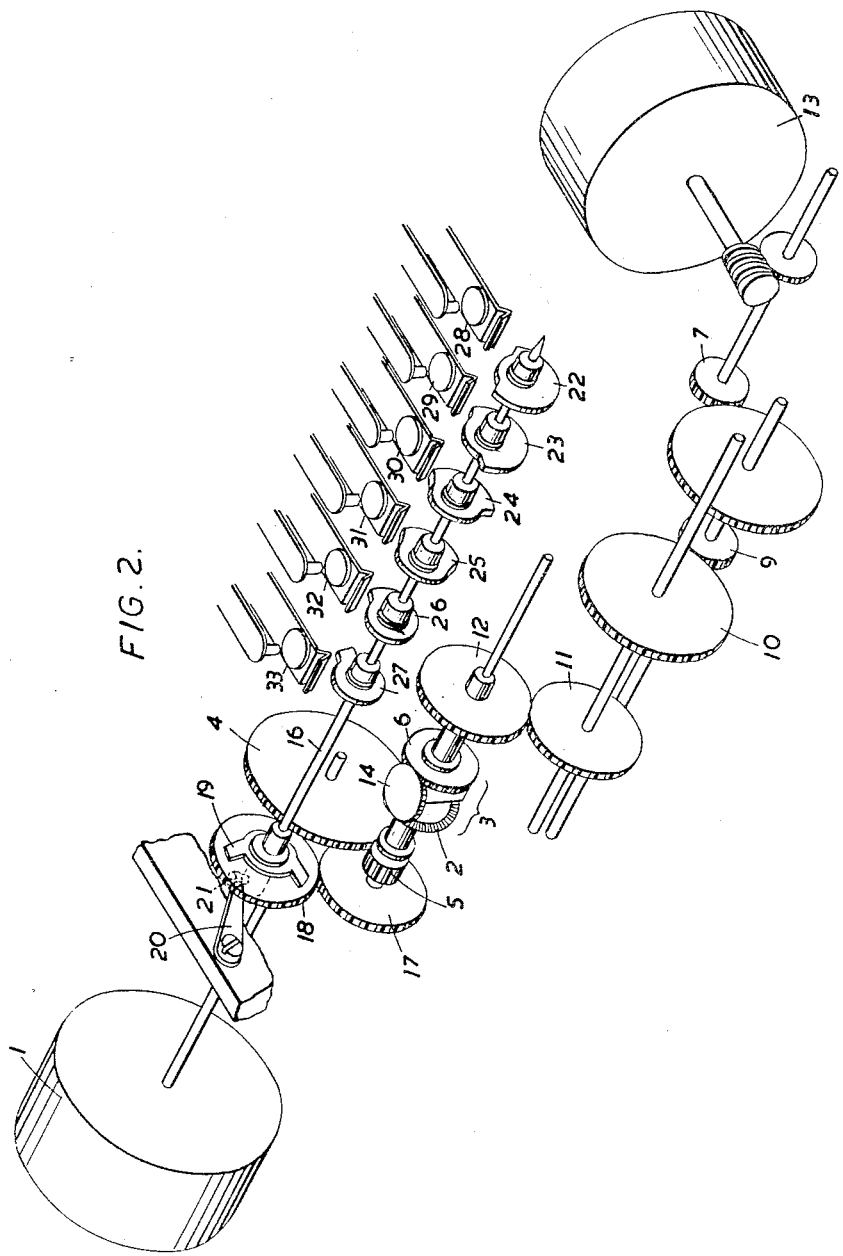

Figure 2 an enlarged perspective view thereof.

Figure 3:
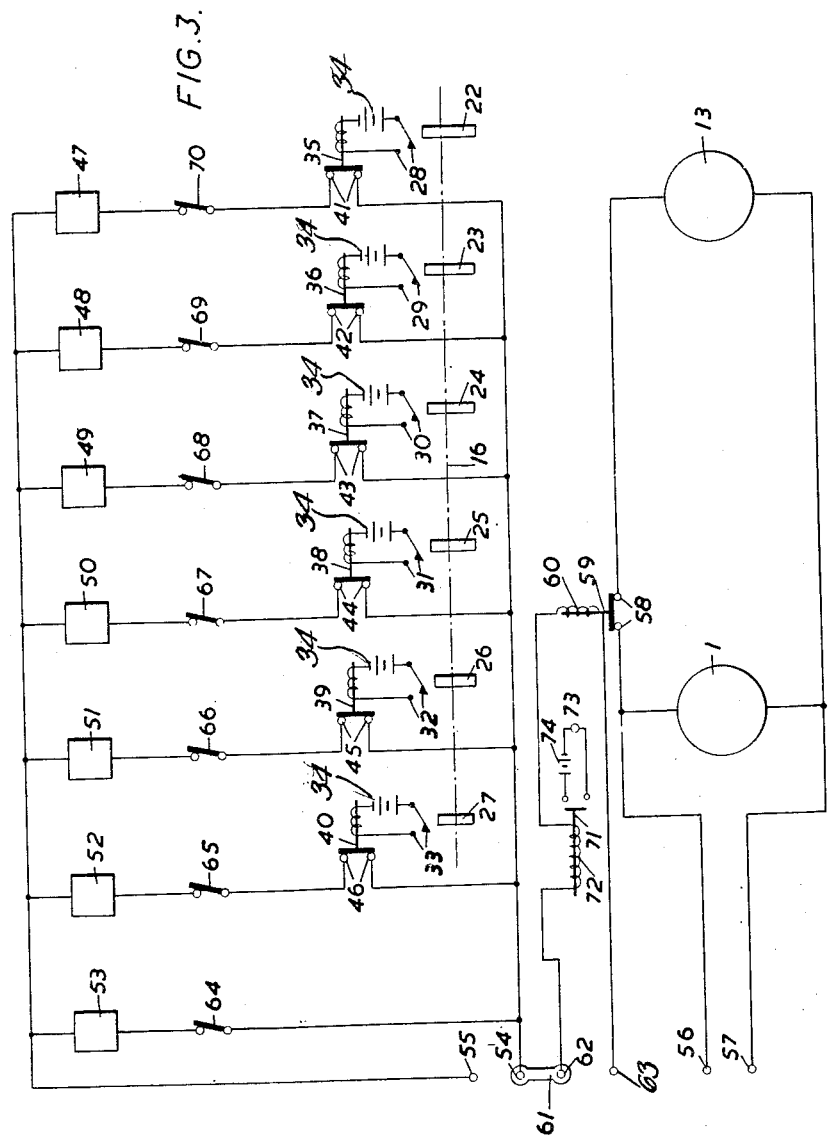

Figure 3 shows a wiring diagram of the apparatus.

Referring now to Figures 1 and 2, the numeral 1 designates a constant speed motor driving on to one crown wheel 2 of a differential gear 3 through a train of gears 4, 5. This motor is an electrically wound clock or spring motor, or a small slow speed shaded pole motor with a Ferraris disc and fitted with a spring-controlled clock-escapement device, which maintains the speed of the crown wheel 2 constant; it may moreover be a synchronous motor energized by the line supply and fitted with a spring-controlled clock-escapement device. The other crown wheel 6 of the differential gear 3 is driven through a train of gears 7—12, by a synchronous motor 13 whose speed is proportional to the frequency of the line supply.

The trains of gearing 4, 5 and 7, 8, 9, 10, 11 and 12, through which the two motors 1 and 13 drive the crown wheels 2 and 6 of the differential gear 3 are of such velocity ratios that when the line frequency which controls the speed of the synchronous motor 13 is standard, the crown wheel 6 driven by the synchronous motor 13 rotates at a slightly greater speed, e. g. 2%, than the other crown wheel 2 driven by the constant speed motor 1. This difference in speed causes the planet wheel assembly 14 comprising the shaft 15, to drive the cam shaft 16 through the gear wheels 17 and 18 and a friction clutch 19.

The cam shaft 16 is capable of clockwise or anti-clockwise rotation through an arc limited by a fixed stop 20, which engages with a projection 21 fixed on the cam shaft 16. When this projection 21 engages with the stop 20 the friction clutch 19 slips.

Upon the cam shaft 16 there are provided a series of cams 22—27 which, on rotation of the cam shaft 16 from one limit of its arc of rotation, successively open and maintain open a series of contacts 28—33. On rotation of the cam shaft 16 from the other limit of its arc of rotation, the cams 22—27 successively close and maintain closed their associated contacts 28—33.

Figure 3 shows a wiring diagram of the apparatus. The contacts 28—33 operated by the cams 22—27 are connected in series with a battery supply 34 for the relays 35—40, the contacts 41—46 of which make or break a consumer's non-essential load circuits 47—52, supplied from the mains terminals 54 and 55. Contacts 28—33 are normally open and when this is so the load circuits 47—52 are closed by the relay contacts 41—46. The circuit 53 represents an essential load circuit (e. g. lighting) and is therefore not controlled by the apparatus. The constant speed motor 1 and the synchronous motor 13 are energised by the line supply from terminals 56 and 57. The contacts 58 of an overload relay 59, 60 make or break the supply to the synchronous motor 13 and the coil 60 of the relay may be connected in series to carry the total consumer's load current by means of link 61 connecting the terminals 54 and 62, the mains input to the consumer being supplied to terminals 55 and 63. There is also provided an additional relay 71, 72 whose coil 72 is connected in series with that of relay 59. The contacts of this relay 71, 72 which are normally open complete the circuit of a lamp or buzzer 73 through the battery 74. The switches 64—70 represent conventional manual isolating switches for the load circuits.

The operation of the apparatus as a load-shedding device controlled from the generating station of the electricity authorities will now be described with reference to the accompanying drawings. The following description will be confined to the operation of a single remote-controlled relay apparatus, but it is to be understood that the electricity authorities will be simultaneously controlling a number of similar devices installed in consumers' premises.

When the line frequency is standard, the projection 21 on the cam shaft 16 is maintained against the stop 20 by the action of the planet wheel assembly 14, the relative speeds of the crown wheels 2, 6 being such that the planet wheel assembly exerts a torque in this direction, slipping of the clutch 19 meanwhile taking place; in this position of the cam shaft all the contacts 28—33 are open and all the controlled load circuits 47—53 closed, the manual switches 64—70 being normally closed. The normal position of the cam shaft with all contacts open is shown in Figure 2. If now the line frequency is lowered at the generating station by a small amount, e. g. one quarter of a cycle, sufficient to cause the torque exerted by the planet-wheel assembly to act in the reverse direction, the cams 22—27 will successively close their associated contacts 28—33 and thereby open their respective non-essential load circuits 47—52. It is convenient that the controlling apparatus should respond in this manner to a lowering of frequency since a lowering of frequency is usually associated with means taken by the supply authorities by which the total load is reduced. Normally each contact system controls a part of the consumer's current consuming apparatus, e. g. electric fires, water-heaters, cookers, and the like, and the cams 22—27 are so disposed on the cam shaft 16 that the first cam 22 coming into action operates that pair of contacts 28 controlling the load 47 which the consumer elects to be considered as his most non-essential load. If the frequency change is continued long enough, the projection 21 on the cam shaft 16 will eventually be driven against the other side of the stop 20 to a position such that all the controlled load circuits 47—52 are open. This frequency change will be continued for only so long as is necessary to reduce the aggregate load on the generating station to the desired level, for it is clear that by a suitable choice of the duration of the frequency change, any required number of controlled non-essential load circuits (at a number of consumers' installations) can be opened  When this result has been attained, the frequency is brought back to the point at which the synchronous motor 13, whose speed is proportional to the line frequency, causes the crown wheel 6 driven thereby to rotate at the same speed as the crown wheel 2 driven by the constant speed motor 1. The line frequency is retained at this value so long as the necessity of cutting the load at the generating station exists. When this is no longer the case, the line frequency is returned to the standard value, and the difference of speeds between the two crown wheels 2 and 6 at this frequency returns the cam shaft 16 to its initial position with its projection 21 against the stop 20, in which position all the controlled load circuits 47—52 are closed.

The operation of the maximum demand cut-out device, which is quite distinct from the use of the apparatus as a long distance controlled load-shedding device, will now be described.

The coil 60 of the overload relay 58, 59, 60 is connected in series with the consumer's load circuits by means of the link 61 and its contacts 58 open when the total current consumption exceeds a predetermined level and thus cuts off the line supply to the synchronous motor 13. The constant speed motor 1 then drives the planet wheel 2 and the cam shaft 16 in the direction to cut out load elements until a sufficient number thereof have been cut out to bring the aggregate load of the consumer down to a level at which the overload relay 59 restores the supply to the synchronous motor 13. The consumer should by then have reduced his current consumption to the allowable maximum by opening one or more of the switches 64—70, so that the cam shaft can be returned to its initial position at which all the relay contacts 41—46 are closed.

There is also provided an overload current relay 71, 72, the coil 72 of which is connected in series with the coil 60 of the overload relay 58, 59, 60, the relay 71, 72 being arranged to complete the circuit of a warning lamp or buzzer 73 when the aggregate current taken by the consumer approaches the level at which the overload or maximum demand cut-out device 58—60 operates. Thus the consumer is warned of an approaching overload and can take the necessary steps to reduce his current consumption. Some such warning device is required, otherwise if the consumer is unaware that he is exceeding his allowable load, the maximum demand cut-out device will initiate a cyclic operation, in which the overload conditions are alternately removed and restored by the rotation backwards and forwards of the cam shaft 16.

One specific application of the apparatus has been described, but it will be understood that the apparatus can be adapted for many other local and/or distant remote control purposes, e. g. signalling systems, control of street lighting, and control of switch gear and other apparatus in substations. For these and other applications the gearing between the motors and the differential gear, and that between the planet wheel assembly and the cam shaft, can be designed so that the device may respond to a change of frequency in the manner required. For instance, if the maximum demand cut out device is dispensed with, the two crown wheels of the differential can be made to rotate at the same speed, when the line frequency is standard. In this case, the cam shaft will be normally stationary, but its rotation in either direction can be initiated by lowering or raising the frequency from the standard value.

Furthermore the design of the cam-shaft assembly and its associated cam operated contacts may be varied in order to perform any required sequence of operations.

In the constructional form of the apparatus described with reference to the accompanying drawings, the cam-operated contacts control battery energized relays; it may however be more convenient to energize these relays from an A. C. supply, e. g. the mains supply. Alternatively, depending on the load currents of the various controlled circuits, and the design of the cam-operated contacts, the relays may be dispensed with and the cam operated contacts used directly to make and break the controlled circuits.

I claim:

1. The combination, with an alternating current electric supply system of the kind wherein means are provided for varying the frequency of the line or mains current of said system, of a synchronous motor powered by said line or mains current and having a speed proportional to the frequency of such current, a differential gear, one crown wheel of which is driven by said motor, a constant speed motor driving the other crown wheel of said differential gear, a cam shaft driven by the planet wheel assembly of said differential gear, contactors actuated by the cams of said cam shaft and load circuits controlled by said contactors.

2. An apparatus according to claim 1, wherein there are provided abutment surfaces on the cam shaft, relatively fixed stops for engaging said abutment surfaces to limit the angle of rotation of said cam shaft, transmission gearing between said cam shaft and said planet wheel assembly, said transmission gearing including as an element a friction coupling.

3. An apparatus for the load control of a consumer's electric circuit, said apparatus comprising a differential gear consisting of two crown wheels and a planet wheel assembly, a constant speed motor driving one crown wheel of said differential gear, a synchronous motor having a speed proportional to the line or mains frequency and driving the other crown wheel of said differential gear, a cam-shaft driven by the planet wheel assembly of said differential gear, contactors actuated by the cams of said cam-shaft, load circuits controlled by said contactors, and an overload or maximum demand relay having its actuating coil arranged in the consumer's circuit and controlling the supply circuit of the synchronous motor whose speed is proportional to the line frequency.

4. An apparatus according to claim 3, wherein there is employed a second relay having its actuating coil in the consumer's circuit and controlling a local circuit that includes a signalling device and a source of electric energy.

5. An apparatus according to claim 1, wherein there are provided abutment surfaces on the cam-shaft, relatively fixed stops for engaging said abutment surfaces to limit the angle of rotation of said cam-shaft, transmission gearing between said cam-shaft and said planet wheel assembly, said transmission gearing including as an element a friction coupling and having such velocity ratios that the crown wheels of the differential gear are rotated at different speeds when the line or mains frequency is standard.

6. An apparatus according to claim 1, wherein the constant speed motor is an electric motor energized by the line supply and provided with a spring-controlled clock escapement device.

7. An apparatus according to claim 1, wherein the constant speed motor is a synchronous motor energized by the line supply and provided with a spring-controlled clock escapement device.

8. An apparatus according to claim 1, wherein the cams on the cam-shaft are arranged so as to open and close successively a plurality of contactors according to the direction of rotation of the cam-shaft.

ERNEST WHITBY.

REFERENCES CITED

The following references are of record in the file of this patent:

UNITED STATES PATENTS

| Number | Name | Date |
|---|---|---|
| 1,310,781 | Bryce | July 22, 1919 |